United States Patent [19]

Romano

[11] Patent Number: 4,887,482
[45] Date of Patent: Dec. 19, 1989

[54] CABLE-GUIDE ELEMENT FOR THE REAR DERAILER OF A BICYCLE

[75] Inventor: Antonio Romano, Padova, Italy

[73] Assignee: Campagnolo S.r.l., Vincenza, Italy

[21] Appl. No.: 363,813

[22] Filed: Jun. 9, 1989

[30] Foreign Application Priority Data

Jun. 15, 1988 [IT] Italy .................... 53337/88[U]

[51] Int. Cl.[4] ................................ F16C 1/10
[52] U.S. Cl. ........................ 74/502.6; 74/502.2; 74/502.4; 188/2 D; 474/82
[58] Field of Search ............ 74/502.2, 502.4, 502.6, 74/489, 488, 501.5 R; 188/2 D, 196 R, 24.11; 474/82, 83, 78, 79, 80, 81

[56] References Cited

U.S. PATENT DOCUMENTS

| | | | |
|---|---|---|---|
| 2,773,398 | 12/1956 | Swain | 74/502.6 |
| 3,535,950 | 10/1970 | Shimano et al. | 74/502.2 |
| 3,957,138 | 5/1976 | Kine | 188/2 D X |
| 4,193,309 | 3/1980 | Nagano | 74/502.2 X |
| 4,198,873 | 4/1980 | Nagano et al. | 74/502.4 X |
| 4,507,101 | 3/1985 | Nagano | 474/82 |
| 4,599,913 | 7/1986 | Dawson | 74/502.2 |
| 4,618,332 | 10/1986 | Nagano | 474/80 |
| 4,637,809 | 1/1987 | Nagano | 474/80 |
| 4,789,379 | 12/1988 | Ozaki et al. | 474/82 |
| 4,801,287 | 1/1989 | Romano | 474/82 |

FOREIGN PATENT DOCUMENTS

| | | | |
|---|---|---|---|
| 934395 | 5/1948 | France | 474/82 |
| 64341 | 9/1955 | France | 474/82 |
| 615562 | 1/1961 | Italy | 474/82 |
| 0850485 | 7/1981 | U.S.S.R. | 474/82 |
| 601743 | 5/1948 | United Kingdom | 474/82 |

Primary Examiner—Vinh Luong
Attorney, Agent, or Firm—Sughrue, Mion, Zinn, Macpeak & Seas

[57] ABSTRACT

A rear derailer for bicycles comprises a first body for fixing to the bicycle frame, a second body which carriers two chain-guide wheels and is connected to the first body by means which enable the second body to be displaced relative to the first body, a metal operating cable having one end fixed to the means for displacing the second body relative to the first body, and a cable-guide sheath provided at one end with a support element having a hemispherical end portion which is supported for rotation by a correspondingly-shaped seat formed in the first body. The support element is provided with a tubular extension for guiding the cable, the extension projecting from the hemispherical portion, passing through the first body, and extending almost to the fixed end of the cable.

1 Claim, 2 Drawing Sheets

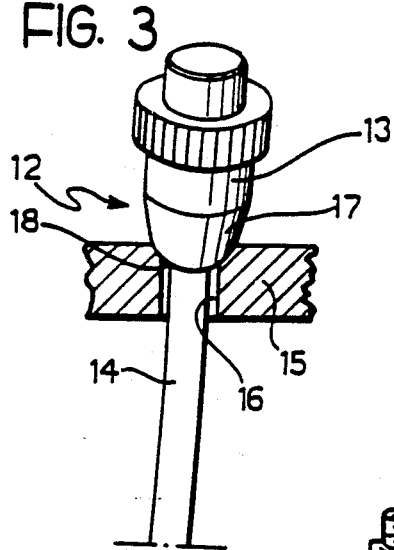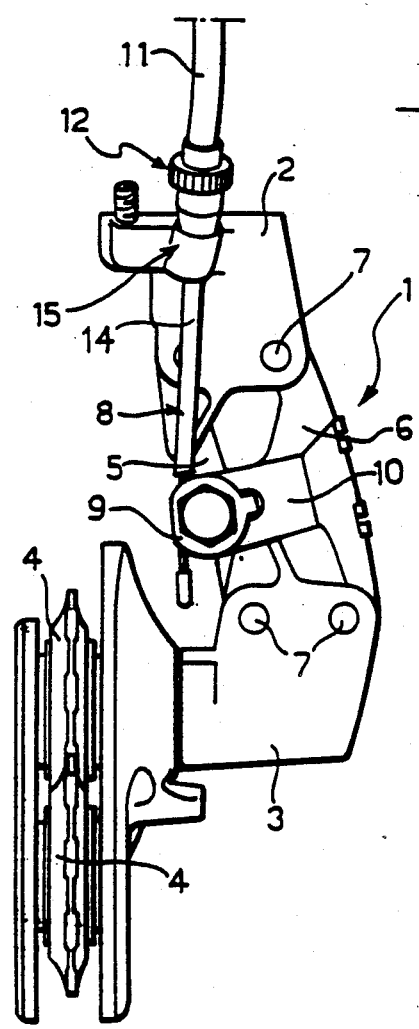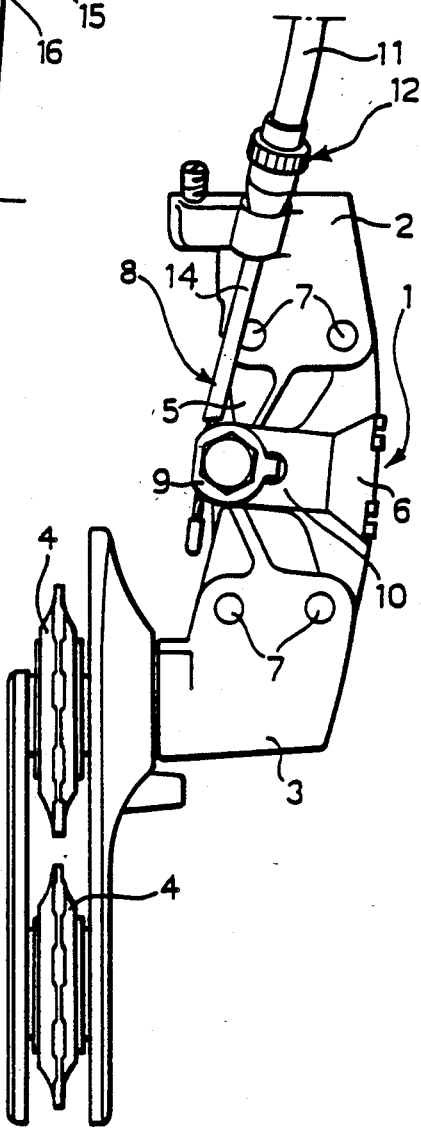

CABLE-GUIDE ELEMENT FOR THE REAR DERAILER OF A BICYCLE

The present invention relates to a rear derailer for a bicycle, of the type comprising:

a first body for fixing to the bicycle frame, a second body which carries two wheels for guiding the bicycle chain and is connected to the first body by means which enable the second body to be displaced relative to the first body, a metal operating cable having one end fixed to the means for displacing the second body relative to the first body, and a guide sheath for the cable, provided at one end with a support element having a hemispherical end portion which is supported for rotation by a correspondingly-shaped seat formed in the first body.

FIGS. 1 and 2 of the appended drawings show prior-art rear derailers for bicycles.

According to the earlier prior art shown in FIG. 1, the guide sheath of the cable bears against the first body at one end and its inclination relative to the upper surface of the first body cannot be varied as a result of successive operations of the derailer. The metal operating cable is therefore continually bent at the point P as a result of each successive operation of the derailer.

In an attempt to avoid this problem, derailers such as that illustrated in FIG. 2 have already been proposed. In this type of derailer, the end of the sheath is fixed to a metal support element having a hemispherical end portion supported for rotation by a correspondingly-shaped seat formed in the upper surface of the first body. The object of the rotary connection is to enable the sheath to follow the changes in the inclination of the cable when the latter is operated. However, in use, the above element is ineffective, since the stiffness of the sheath prevents its movement, so the cable is still bent at the point P as a result of its operation.

The object of the present invention is to provide a derailer of the type specified at the beginning of the present description which does not have the above disadvantage.

According to the present invention, this object is achieved by virtue of the fact that the support element is provided with a tubular extension for guiding the cable, the extension projecting from the hemispherical portion, passing through the first body, and extending almost to the fixing end of the cable.

By virtue of this characteristic, the bending of the cable as a result of its operation and the consequent weakening of the cable itself are avoided.

Further characteristics and advantages of the present invention will become clear from the detailed description which follows with reference to the appended drawings, provided by way of non-limiting example, in which:

FIG. 3 shows a cable-guide element according to the invention, on an enlarged scale, FIGS. 4 and 5 show a derailer provided with the device according to the invention in two different operative positions.

Figure 1:
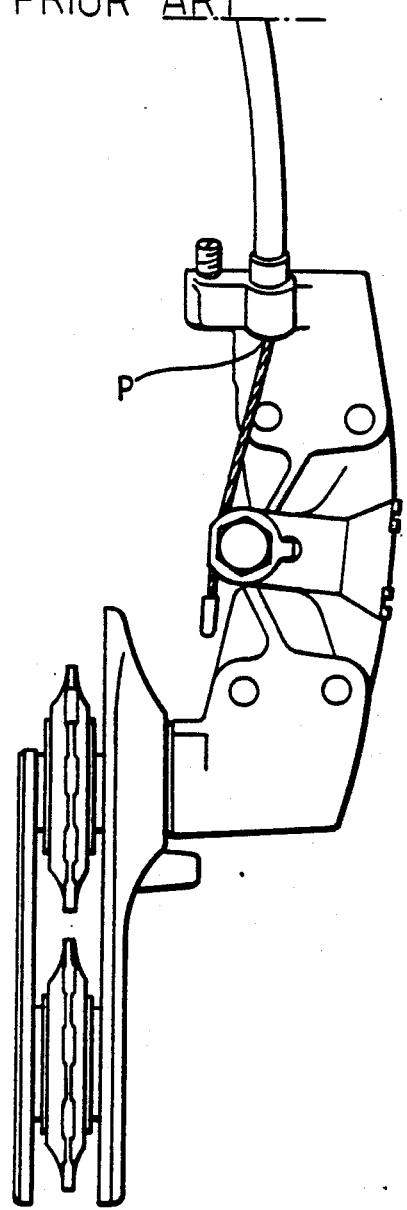
FIGS. 1 and 2 show a prior-art derailer.
Figure 2:
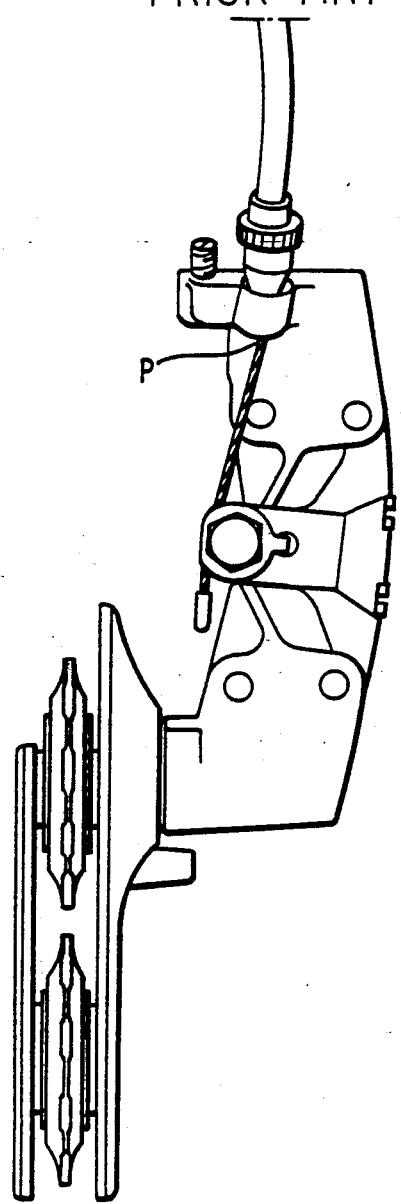

A rear derailer for a bicycle is shown in its entirety in FIGS. 4 and 5. The derailer 1 includes, in known manner, a first body 2 connected to the bicycle frame (not shown) and a second body 3 which carries the chain-guide wheels 4. The second body 3 is articulated to the first body 2 by means of a parallelogram joint formed by two connecting rods 5 and 6. The connecting rods 5 and 6 have their ends articulated to the first body 2 and to the second body 3 respectively by means of longitudinal pins 7.

A metal operating cable 8 has one end 9 fixed to an appendage 10 of the connecting rod 6. The opposite end of the cable 8 is operated by a conventional control lever (not shown) mounted on the bicycle frame. The cable 8 is slidable in a guide sheath 11 provided with a guide element 12 at one end.

As shown in FIG. 3, the guide element 12 has an internal bore for the passage of the cable 8 and includes an upper body 13 which is provided with a tubular extension 14 at its lower end. The upper body 13 of the element 12 bears against the upper part of a projection 15 of the first body 2. The projection 15 of the first body 2 has a hole 16 in which the tubular extension 14 of the element 12 is arranged. The body 13 of the element 12 is provided at its bottom with a hemispherical portion 17 which bears against a correspondingly-shaped seat 18 formed in the upper surface of the projection 15, in correspondence with the hole 16.

The operation of the derailer control lever causes a displacement of the second body 3 relative to the first body 2, and the guide wheels 4 cause the movement of the chain from one sprocket of a set of sprockets carried by the hub of the rear wheel of the bicycle to another. The inclination of the cable 8 changes as a result of this movement, as can be seen from a comparison of FIGS. 4 and 5. During the change of inclination, the metal cable 8 compels the tubular extension 14 to take up the same inclination. The guide element 12 therefore rotates in the seat 18 and imposes a variation in the inclination on the sheath 11. The section of the cable 8 between the first body 2 and its fixing end 9 therefore remains perfectly straight and the bending and weakening of the cable are avoided.

Naturally, the principle of the invention remaining the same, the forms of embodiment and details of construction may be varied widely with respect to those described and illustrated without thereby departing from the scope of the present invention.

What is claimed is:

1. A rear derailer for bicycles comprising:
   a first body for fixing to a bicycle frame,
   a second body which carries two wheels for guiding a bicycle chain;
   means which connect the second body to the first body and enable the second body to be displaced relative to the first body,
   a metal operating cable having one end fixed to the means for displacing the second body relative to the first body, and
   a cable-guide sheath provided at one end with a support element having a hemispherical end portion, the first body defining a seat which has a shape corresponding to that of the end portion and in which the hemispherical end portion is supported for rotation, wherein the support element is provided with a tubular extension for guiding the cable, the extension projecting from the hemispherical portion, passing through the first body, and extending almost to the fixed end of the cable.

* * * * *